United States Patent [19]

Storz

[11] 3,771,045
[45] Nov. 6, 1973

[54] D-C POWER SUPPLY SYSTEM FED FROM AN A-C GENERATOR

[75] Inventor: Peter Storz, Sindelfingen, Germany

[73] Assignee: Robert Bosch GmbH, Gerlingen-Schillerhohe, Germany

[22] Filed: Aug. 8, 1972

[21] Appl. No.: 278,727

[30] Foreign Application Priority Data
Sept. 28, 1971 Germany............... P 21 48 242.8

[52] U.S. Cl............... 322/28, 320/59, 320/61, 321/5, 322/70, 322/73, 322/79
[51] Int. Cl. ........................................ H02p 9/26
[58] Field of Search ............... 322/28, 59, 79, 70, 322/73; 320/53, 57, 58, 59, 61; 321/5

[56] References Cited
UNITED STATES PATENTS
3,353,090  11/1967  Sawyer..................... 322/79 X
3,549,919  12/1970  Spisak....................... 322/59 X

*Primary Examiner*—James D. Trammell
*Attorney*—Robert D. Flynn et al.

[57] ABSTRACT

To provide regulated output from a polyphase generator having a field winding in shunt circuit, output rectifiers from the polyphase generator are connected to be half-wave rectifiers and exciter rectifiers for the field winding are connected in a full-wave rectification circuit, so that higher excitation voltage is available even upon full loading of the generator.

9 Claims, 4 Drawing Figures

3,771,045

D-C POWER SUPPLY SYSTEM FED FROM AN A-C GENERATOR

The present invention relates to a d-c power supply system in which a polyphase a-c generator having a shunt field has a separate rectifier network for the shunt field, and more particularly to such a generator for use in mobile installations, for example for automotive use.

D-c power supply systems utilizing alternators usually are so constructed that a full-wave rectifier is provided to rectify the output current from the generator, the full-wave rectified d-c being supplied to the terminals of the d-c network.

Half-wave rectifiers, which may have been complemented by one of the two rectifier elements of the full-wave rectifier are then customarily used to provide d-c for the field. In such arrangements, the voltage supplied to the field is essentially the same as the voltage of the power circuit.

It is an object of the present invention to improve the efficiency and the utilization of a polyphase generator, typically a polyphase alternator for mobile use.

SUBJECT MATTER OF THE PRESENT INVENTION

Briefly, the effectiveness of the alternator can be improved by increasing the voltage available for the field with respect to the voltage available to supply the output load; a half-wave rectifier arrangement is provided for the output load, whereas a full-wave rectifier circuit is provided to supply the field winding of the generator. The output winding of the generator may be a three-phase winding, or may be wound as a six-phase winding. A six-phase winding has the advantage that the resulting d-c will have a smaller a-c component, that is, will be less fluctuating. Preferably, the star or center point of the generator is connected to one terminal of the d-c load network, the free terminal ends of the output windings then being connected to load diodes, preferably in a bank, to which the other terminal of the d-c network is connected. Additionaly, the free terminals are further connected to a set of exciter diodes which are connected to a voltage regulator, to control the current being supplied to the field winding. In a preferred form, the interconnected anodes of the load diodes provide the negative terminal of the d-c network, whereas their cathodes are connected to the free terminal of the armature windings of the generator and, additionally, to the anodes of the exciter diodes. The combined cathodes of the exciter diodes are then connected in the field winding circuit.

The number of diodes can be reduced when a generator having a six-phase output winding is used, if only three phases of the output windings of the generator, one each, are connected over an exciter diode with the field, whereas all six phases of the output windings are connected over a diode each to one terminal of the d-c network. A full complement of diodes for the field winding is only necessary if the exciter voltage for the field winding must be particularly uniform and free from a-c components. In this instance, preferably, all six outputs windings of the generator are connected to an exciter diode each.

The d-c power supply system can be further constructed with a minimum of components by utilizing controlled rectifiers as exciter diodes, connected in such a manner that the anode-cathode path provides current for the field winding and the control or gate electrodes are connected to a voltage regulator. This circuit permits the use of a voltage regulator or controller integrated into the entire network without additional switching contacts or elements. Structurally, the load diodes, and the exciter diodes (or controlled rectifiers) are preferably combined in a single structural element to facilitate replacement in case of malfunction of any one component.

The invention will be described by way of example with reference to the accompanying drawings, wherein.

Figure 1:
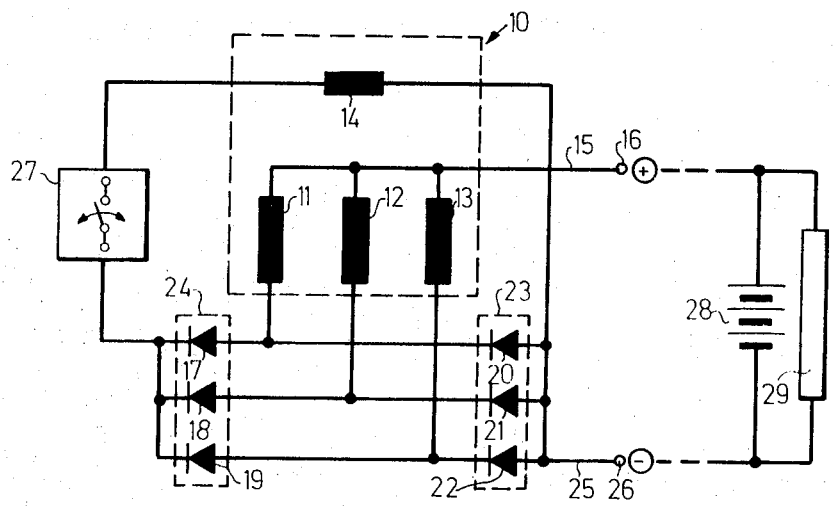
FIG. 1 is a schematic circuit diagram of a d-c supply system from a three-phase generator.

A three-phase generator, schematically indicated at 10, has three armature windings 11, 12, 13 and a shunt-connected field winding 14. The common ends of the armature windings are connected to a center or star point forming a junction 15 which is connected to the positive terminal 16 of a direct current utilization network. The free ends of the windings 11, 12, 13 are each connected to the anode of an exciter diode 17, 18, 19, respectively, and further to the cathode of a load diode 20, 21, 22. Load diodes 20–22 are combined as a single rectifier bank 23, and are secured to a single cooling fin or cooling plate (not shown). The exciter diodes 17–19 are assembled in a single exciter diode bank 24. Usually, special cooling for the exciter diodes 24 is not required, but if necessary, the exciter diodes may also be located on a cooling body, heat sink, or the like.

The anodes of the power or load diodes 20–22 are interconnected and, in turn, connected by line 25 to the negative terminal 26 of the d-c network which is, further, connected to one end of the field winding 14. The cathodes of the exciter diodes 17–19 are likewise interconnected and, jointly, connected to a voltage regulator 27 and then to the other end of field winding 14. Voltage regulator 27 may be any structure known in the art, for example a transistorized voltage regulator. Positive terminal 16 and the negative terminal 26 of the d-c utilization network can be connected to d-c loads, such as the battery 28, and a load 29.

OPERATION

As soon as the rotor of the generator 10 begins to rotate, the remaining magnetism therein will cause a voltage to be induced in output windings 11–13 of the generator. This voltage is rectified in the power diode bank 23 as well as in the exciter diode bank 24. The output voltage applied to the field winding 14 will be derived by full-wave rectification of the a-c input, since both the exciter diodes 17–19 as well as the power or load diodes 20–22 are in circuit with the field winding 14. This direct voltage causes a field current to flow over the voltage regulator 27 and the field winding 14, causing the output voltage of the generator to rise unitl it reaches its nominal or commanded value, which is then controlled by the voltage regulator 27, as well known, by periodic interruption of the field current.

The d-c output current supplied to battery 28 and/or the load 29 is subjected only to half-wave rectification.

The star or center connection of the generator is at a positive voltage with respect to the anodes of the power diodes 20–22, so that load current will flow from the positive terminal 16 of the d-c network over the load, to the negative terminal 26.

The exciter voltage is substantially higher than the d-c voltage applied to the terminals 16, 26 for the load since the output rectification for the load circuit is a half-wave rectification, whereas the exciter or field circuit is subject to full-wave recification. A higher voltage in the exciter circuit provides, with the same number of turns, that is, the same space for windings in the generator, a higher magnetic flux; or, if the iron structure of the generator already is at saturation, less space is needed for the field winding. In both instances, the alternator is utilized more effectively.

Figure 4:
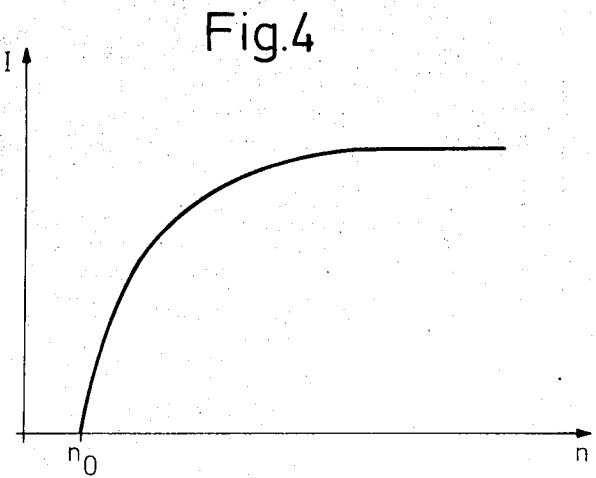
FIG. 4 is a current (ordinate) versus speed (abscissa) diagram of the characteristics of the system.

The current-speed characteristics of the generator, illustrated in FIG. 4, is improved since current will rise faster, upon increasing speed. This effect is obtained since the relationship between power output voltage and exciter voltage is not constant, but rather, as the generator is more highly loaded, the difference between field voltage and power voltage will increase. This causes the current-speed characteristics to be steeper. It has been found, additionally, that sudden load pulses, transferred to the generator upon sudden switching on or off, of heavy loads, for example, can be better compensated.

Figure 2:
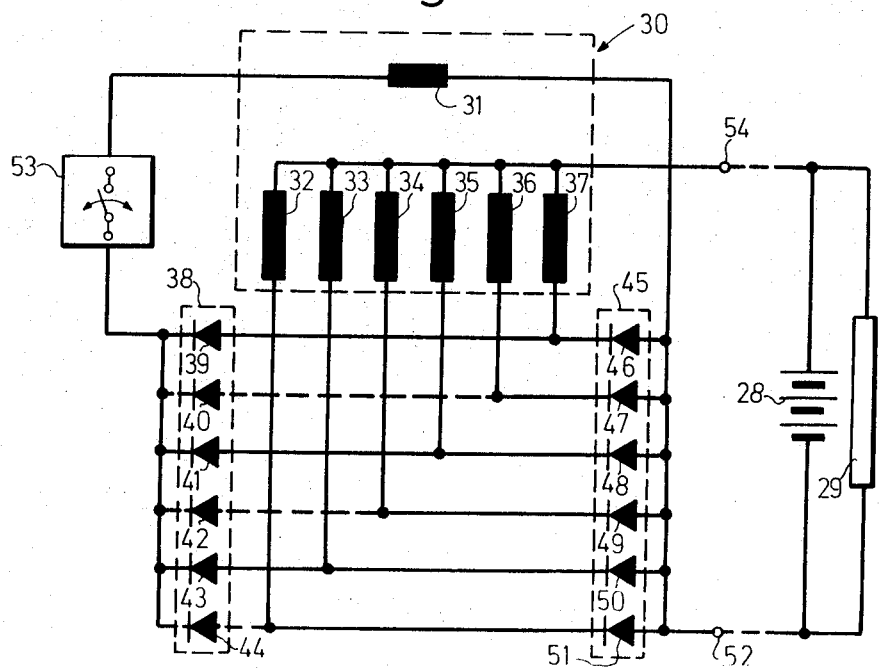
FIG. 2 is a similar diagram using a six-phase generator.

FIG. 2 illustrates a generator 30 having a field winding 31 and six output windings 32 to 37. The arrangement, in principle, is similar to that of FIG. 1. The essential difference is that a six-phase arrangement provides for output current of low a-c component, that is, of only little waviness. Usually, requirements for uniformity of voltage in the field circuits are not high; if, therefore, the requirements with respect to freedom from a-c components in the field winding are low, three of the six exciter diodes may be omitted. The exciter diode bank 38 includes exciter diodes 39 to 44. If only full-wave three-phase rectification is necessary for the field winding, diodes 40, 42 and 44, for example, as well as the associated interconnecting lines (shown in dashed form) may be omitted. The load diode set 45 has load diodes 46–51 therein. Load diodes 46–51 have their cathodes connected to the free terminals of the six output winds and, to the extent that they are present, to the anodes of the exciter diodes in the exciter diode bank 38. The anodes of the power diodes are interconnected, and further connected to the negative terminal 52 of the d-c network, and additionally to one terminal of the field winding 31. The terminal of the field winding is connected to a voltage regulator 53 which, in turn, connects to a common junction to which the cathodes of the respective exciter diodes 39–44 (or 39, 41, 43) are connected. The center or star point of the generator output winding forms the positive terminal 54 of the d-c network which, again, is connected to a battery and a load. The operation of the circuit of FIG. 2 is the same as that of the circuit of FIG. 1.

Figure 3:
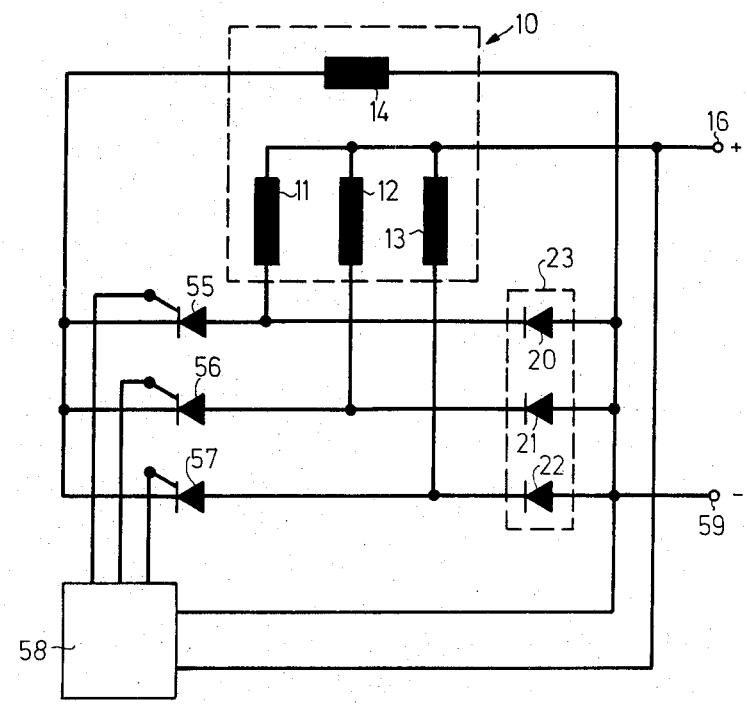
FIG. 3 is a diagram with a three-phase generator utilizing controlled rectifiers.

The overall d-c power supply system can be constructed with a lesser number of components by combining the interrupting functions of the voltage regulator 27, 53 (FIGS. 1, 2) with the rectifying function of the exciter diodes. This circuit is shown in FIG. 3, in which a three-phase generator 10, having output windings 11, 12, 13 and a field winding 14 is shown, similar to FIG. 1. The star or center point of the output windings is connected to the positive terminal 16 of the d-c network, the free ends of the armature windings 11, 12, 13 are connected each to a power diode 20–22 and further to the anode of a controlled rectifier 55, 56, 57. The cathodes of the controlled rectifiers are interconnected and, in turn, connected to one terminal of the field winding 14, the other end of which is connected to the negative terminal of the d-c network, that is, the common anode connection of the power diodes 20–22. The controlled rectifiers may be thyristors, such as silicon controlled rectifiers (SCR), or they may be gate controlled switches (GCS) or similar components.

The control or gate electrode of the controlled rectifiers 55, 56, 57, each, is connected to a voltage regulator 58. Voltage regulator 58 is connected across the d-c network, that is, has inputs connected across negative and positive terminals 59, 16, of the d-c network. The voltage regulator 58, in this instance, provides triggering or firing pulses for the controlled rectifiers. By replacing the exciter diodes by controlled rectifiers, the total component requirement for the circuit can be substantially decreased since the controlled rectifiers replace both the exciter diodes as well as the switching elements of the voltage regulator.

The circuit of FIG. 3 may, of course, be used with the circuit of FIG. 2, in which case the diodes in bank 38 are to be replaced by controlled rectifiers.

The present invention has been specifically described with respect to a three-phase or six-phase generator; various various other polyphase systems may be used. It is particularly adaptable for mobile installations, for example for automotive use.

Various changes and modifications may be made within the inventive concept.

If desired, smoothing condensers may be connected across the half-wave rectified output, as is customary in half-wave rectifiers.

I claim:

1. D-C power supply system supplying a d-c network at a pair of load terminals, including
   a polyphase generator, a shunt field winding for the generator, output rectifiers to supply d-c output power at the load terminals, and an excitation rectification circuit including exciter rectifiers, to supply d-c power for the field winding,
   wherein the output rectifiers are connected in a half-wave rectification circuit to the generator windings and the load terminals, and further form a portion of the excitation rectification circuit and, together with the exciter rectifiers are connected in a full-wave rectification circuit to the generator shunt winding.

2. System according to claim 1, wherein the generator is a three-phase generator and the output windings of the generator are three-phase windings.

3. System according to claim 1, wherein the output windings of the generator are connected as six-phase windings.

4. System according to claim 3, wherein all six phases (32–37) of the generator windings are connected to the d-c network;
   and only three phases (33, 35, 37) are connected, one each, to a respective exciter rectifier (39, 41, 43) and to the field winding.

5. System according to claim 1, wherein the generator is star-connected, the star point being connected to one terminal of the d-c network, the free end terminal of the generator armature windings being connected to one terminal of the power rectifiers, the other terminal of the rectifiers being interconnected to form another terminal of the d-c network;

and the free end terminals of the generator armature windings are further connected to the exciter rectifiers, the exciter rectifiers supplying d-c full-wave rectified excitation power for the field winding.

6. System according to claim 5, further comprising a voltage regulator inserted between the exciter field winding and the exciter rectifiers.

7. System according to claim 5, wherein the power rectifiers have their anodes connected to the negative terminal of the d-c network;

the cathodes of the power rectifiers are connected to the free end terminals of the armature windings of the generator and to the anodes of the exciter rectifiers;

the cathodes of the exciter rectifiers are interconnected;

the voltage regulator is connected in circuit with the cathodes of the exciter rectifiers and the field winding;

and the field winding circuit comprises: exciter rectifiers, voltage regulator, field winding, power rectifiers, to provide full-wave rectification of the exciter current for the field winding and voltage regulation of the output voltage.

8. System according to claim 1, wherein the exciter rectifiers are controlled rectifiers having their main power path (anode-cathode) connected in the field winding circuit;

and a voltage regulator supplying firing pulses being connected to the gate circuit of the controlled rectifiers to trigger the controlled rectifiers.

9. System according to claim 1, wherein the power rectifiers are mounted as a complete assembly in a rectifier bank and the exciter rectifiers are mounted as a complete assembly in a second rectifier bank.

* * * * *